May 30, 1944.  C. C. FUERST  2,350,106
SHUTTER RELEASE MECHANISM
Filed July 28, 1943
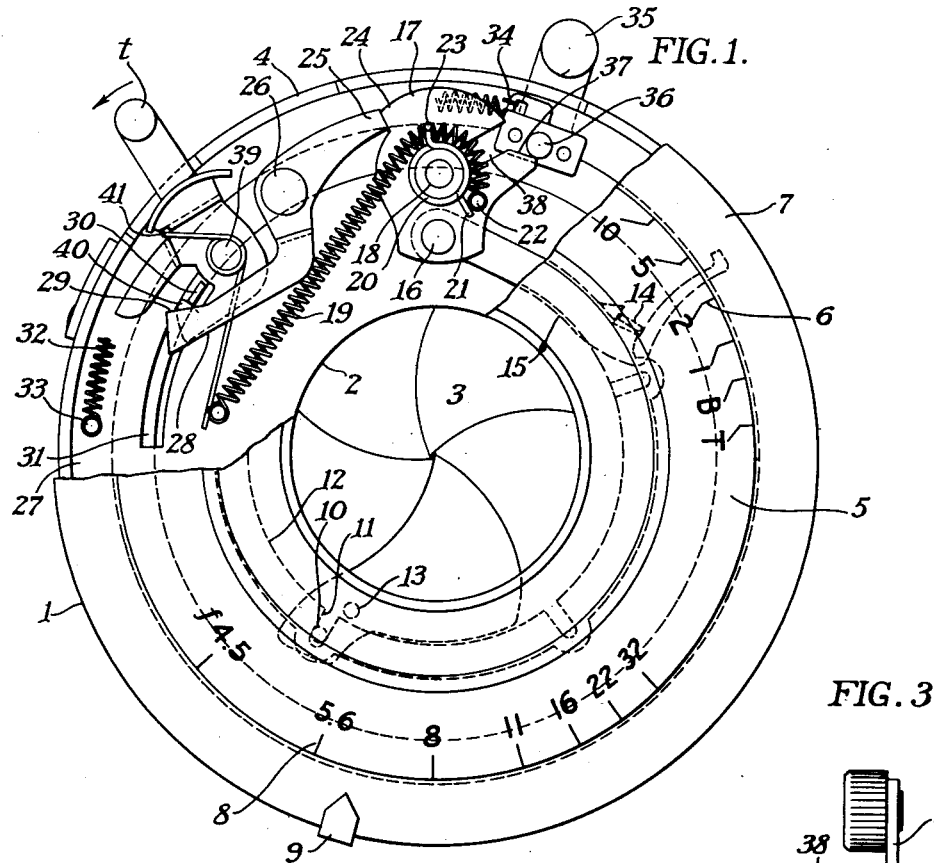
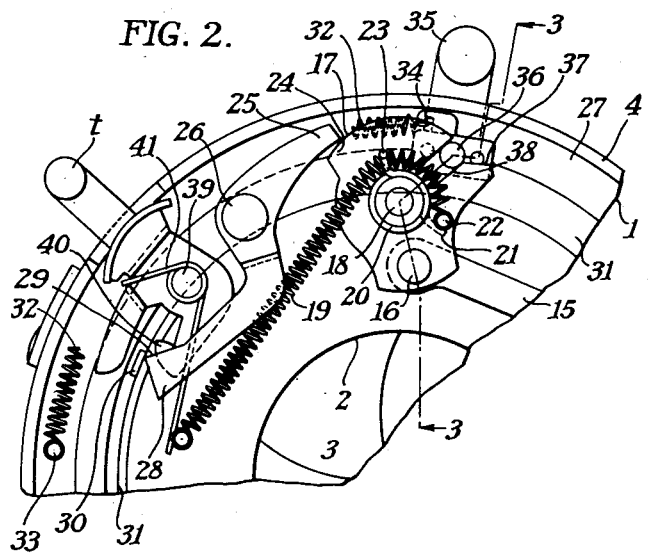
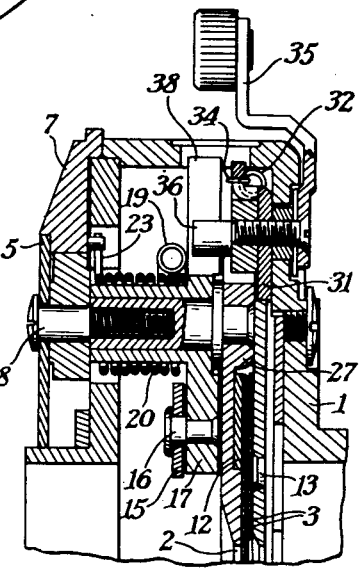
CARL C. FUERST
INVENTOR
BY
ATTORNEYS Patented May 30, 1944

2,350,106

UNITED STATES PATENT OFFICE 2,350,106

SHUTTER RELEASE MECHANISM

Carl C. Fuerst, Rochester, N. Y., assignor to Eastman Kodak Company, Rochester, N. Y., a corporation of New Jersey Application July 28, 1943, Serial No. 496,462

7 Claims. (Cl. 95—63)

This invention relates to photography and more particularly to shutters of the between-the-lens type. One object of my invention is to provide a shutter in which only light pressure upon the trigger is required for releasing the shutter to make an exposure. Another object of my invention is to provide a setting shutter with a simple type of releasing mechanism in which an overtravel of the setting member is included in the setting mechanism. Another object of my invention is to provide a shutter especially adapted for certain types of cameras, in which the shutter mechanism may be mechanically connected to a film-winding mechanism. A still further object of my invention is to provide a shutter with an overtravel in the setting mechanism so arranged that this overtravel may be used for synchronizing the shutter with various types of flash lamps. Other objects will appear from the following specification, the novel features being particularly pointed out in the claims at the end thereof.

In a copending application for "Shutter release," Serial No. 456,346, August 27, 1942, Mr. William A. Riddell has shown a shutter release in connection with a setting shutter, which has numerous advantages over known types of shutter releases, particularly when used in connection with the "Photoflash synchronizing apparatus," shown in his Patent 2,319,086, granted May 11, 1943. My present invention is directed to a modification of the shutter release shown in this patent application and to a structure which can be advantageously used in connection with a photoflash synchronizing apparatus, as disclosed in the above mentioned patent.

Coming now to the drawings in which like reference characters denote like parts throughout:

Fig. 1 is a front plan view with certain parts broken away of a shutter including a shutter release mechanism constructed in accordance with and embodying a preferred form of my invention.

Fig. 2 is a fragmentary plan view of parts of the shutter release mechanism, shown in Fig. 1, the parts being in the position they assume just after the trigger has been depressed to release the shutter.

Fig. 3 is an enlarged fragmentary detail section taken on line 3—3 of Fig. 2.

In shutters of the setting type in which the master member includes a lever which must be manually or mechanically operated to tension a shutter spring, it is generally possible to obtain a release in which but little pressure is required on the trigger for releasing the shutter. This is true, however, only when a single spring is used to drive the master member. In cases where additional springs are brought into an operative position, as for high speed exposures only, it generally happens that while light pressure may be sufficient for releasing the trigger for certain exposures, a greater pressure may be required when the additional spring is brought into use for higher speed exposures. This is undesirable. First, it is undesirable because the user may be accustomed to the light pressure and when the occasional heavier pressure is required, the user may shake the camera in depressing the trigger. Second, it is undesirable because if the shutter is equipped with a mechanism synchronizing the shutter for photoflash work, as in Patent 2,319,086 above referred to, the difference in pressure required to release the shutter may disturb the photoflash timing mechanism. My present invention is directed to overcoming these difficulties.

My invention consists broadly in providing a trigger which will have a constant release pressure even though for high speed exposures an additional spring is brought into an operative position with respect to the master member. Thus the trigger pressure required will always be the same, regardless of the exposure used.

Referring to Fig. 1, my shutter may consist of a shutter casing designated broadly as 1 and having an exposure aperture 2, normally covered by shutter blades 3, which blades may be moved to an open and shut position for making an exposure through a known type of mechanism.

The shutter casing may include an upstanding flange 4 around the periphery of the shutter, a shutter cover plate 5 preferably bearing shutter speed graduations on a scale 6 and preferably including a setting ring 7, which may be moved to bring a suitable pointer (not shown) opposite a graduation on the scale 6 to indicate the exposure. The shutter plate 5 may also include a second scale 8 graduated into units of diaphragm opening and a pointer 9 to indicate the setting of the diaphragm on this scale.

Each shutter blade 3 may have a pin 10 and slot 11 connection with a blade operating ring 12, and each shutter blade may be pivoted at 13 to the shutter casing. These blades may be simultaneously operated when the blade ring 12 is oscillated through the lug 14 and the latch 15 in a known manner.

The latch 15 is pivotally attached at 16 to a master member 17, which may oscillate upon a stud 18 and which is normally turned in a counterclockwise direction with respect to Fig. 1 by means of an operating spring 19. In the present instance, the spring 19 is used for all of the exposures, this spring being sufficient in itself for all except the high speed exposure. When the highest speed exposure is to be made, a supplementary spring 20, coiled about the stud 18 and having one end 21 engaging a pin 22 also supporting one end of spring 19, is brought into play. The opposite end 23 of the spring 20 is engaged and tensioned by means of a suitable pin (not shown) carried by the setting ring 5. Thus when the shutter is set for its highest speed exposure, both springs are used to turn the master member 17 about the stud 18.

Fig. 1 shows the shutter in a set position ready to make an exposure. From this figure it will be noticed that a latch element 24, carried by the master member, is in engagement with the latch element 25, carried by a stud 26 supported on the mechanism plate 27. This latch element has a downwardly extending arm 28, the cam surface 29 on the end lying in the path of an upstanding lug 30 carried by the setting ring 31.

The setting ring 31 is normally turned in a counterclockwise direction with respect to Fig. 1 by means of a spring 32 anchored at 33 to the shutter casing, and at 34 to the setting handle 35. The ring 31 carries a setting pin 36 which, in a set position, lies adjacent the flat surface 37 of the master member 24. This flat surface extends to one edge of a slot 38, which is of such a width that the pin 36 may slide freely therein. The slot 38 preferably extends radially of the master member and is of such a length that in swinging the setting lever 35, the pin 36 may ride back and forth in this slot.

The trigger t is a lever pivoted at 39 to the mechanism plate 27, and it includes a hook 40, which normally engages the lug 30 when the shutter is set as shown in Fig. 1. A spring 41 tends to turn this lever in a clockwise direction with respect to Fig. 1. Therefore, when the trigger t is moved in the direction shown by the arrow against the pressure of spring 41, it turns about its pivot 39 and causes the hook 40 to release the lug 30, as shown in Fig. 2. As soon as the lug 30 is released, the ring 31 with the setting lever 35 starts to move under the impulse of the spring 32.

This causes the pin 36 to pass along the adjacent flat surface of the master member 17 and as this occurs, the lug 30 strikes the cam surface 29, swinging the latch about its pivot 26 and releasing the latch element 25 from the master member latch element 24.

At the time the latch elements 24—25 release, the pin 36 has reached the radial slot 38 in the master member. The master member therefore may turn rapidly under the impulse of the spring 19 alone for most exposures, or under the impulse of the combined springs 19 and 20 if the shutter is set for the highest speed exposures.

It should be noticed that from the standpoint of the operator the releasing pressure on the trigger t is never greater than the forces required to release the latch elements 30—40 plus the force necessary to overcome spring 41. It does not matter whether or not spring 20 has been tensioned because the master member 17 is always held by the latch 24—25 until after the shutter is released.

In this way the trigger t can be made a very light release, that is, the parts may be so arranged and the spring 41 may be so light that an extremely light pressure on the trigger is all that is necessary to release the shutter for an exposure. Moreover, with this construction, if the shutter contains the photoflash synchronizing structure shown in Patent 2,319,086, this structure can be readily synchronized because of the releasing characteristics of the shutter. The present invention is particularly directed to improving the operation of a shutter shown in the Riddell application and patent, both above referred to, in that with my improved structure, it is possible to utilize an additional power spring 20 in order to obtain a still higher speed of exposure and maintain the very desirable characteristics of the Riddell application and patent in providing a shutter in which the trigger pressure is extremely light and even. It has been found that such a release greatly improves the operation of a shutter and materially lessens the number of exposures in which the operator shakes the camera. It also enables an operator to make longer exposures without using a camera support or tripod, and by my improved release mechanism, it permits all of the shutter speeds to be properly synchronized even when a supplementary spring is used for obtaining the highest speed of exposure.

I am not claiming the use of a supplementary spring for high speed exposures in itself because such springs are known and have been used in numerous setting shutters. I am directing my claims to the particular shutter release mechanism which permits the same pressure on the shutter release for all exposures, while also maintaining the desirable overtravel of the setting member with respect to the master member, which is so desirable in mechanically connecting a setting shutter with an automatic film-winding camera, and which is also desirable for properly synchronizing multi-spring setting shutters for use with flash lamps.

I claim:

1. In a photographic shutter including an apertured casing, shutter blades pivotally mounted in the casing, a blade ring for operating the shutter blades, a master member and operative connection between the master member and the blade ring for operating the latter from the former, the combination with said master member, of a setting member movable through a path of movement on the casing and slidably engaging the master member in moving it to a set position, a latch element on the master member, a latch carried by the casing for engaging and holding the latch element of the master member in a set position, the setting member being movable in a setting direction a material distance after the master member is latched in a set position, a spring tending to move the setting member in a non-setting direction, a trigger movably mounted and including a trigger latch element, a lug on the setting element positioned to be held by the trigger latch after setting the master member, said latch for the master member lying in the path of movement of the setting member to be operated thereby when moved by its spring upon the release of the setting member by the trigger, whereby the master member may move only after movement of the setting member.

2. In a photographic shutter including an apertured casing, shutter blades pivotally mounted in the casing, a blade ring for operating the shutter blades, a master member and operative connections between the master member and the blade ring for operating the latter from the former, the combination with said master member, of a setting member movable through a path of movement on the casing and slidably engaging the master member in moving it to a set position, a latch element on the master member, a latch carried by the casing for engaging and holding the latch element of the master member in a set position, the setting member being movable in a setting direction a material distance after the master member is latched in a set position, a spring tending to move the setting member in a non-setting direction, a trigger movably mounted and including a trigger latch element, a lug on the setting element positioned to be held by the trigger latch after setting the master member, said latch for the master member including a cam normally crossing the path of movement of the setting member to be engaged and moved by travel of the setting member under the impulse of its spring.

3. In a photographic shutter including an apertured casing, shutter blades pivotally mounted in the casing, a blade ring for operating the shutter blades, a master member and operative connections between the master member and the blade ring for operating the latter from the former, the combination with said master member, of a setting member movable through a path of movement on the casing and slidably engaging the master member in moving it to a set position, a latch element on the master member, a latch carried by the casing for engaging and holding the latch element of the master member in a set position, the setting member being movable in a setting direction a material distance after the master member is latched in a set position, a spring tending to move the setting member in a non-setting direction, a trigger movably mounted and including a trigger latch element, a lug on the setting element positioned to be held by the trigger latch after setting the master member, said latch for the master member lying in the path of movement of the setting member adjacent the lug thereof whereby upon release of said lug on the setting member by the trigger, the spring may move the setting member and lug and said lug may strike and move the latch for the master member to make an exposure.

4. In a photographic shutter including an apertured casing, shutter blades pivotally mounted in the casing, a blade ring for operating the shutter blades, a master member and operative connections between the master member and the blade ring for operating the latter from the former, the combination with said master member, of a setting member movable through a path of movement on the casing and slidably engaging the master member in moving it to a set position, a latch element on the master member, a latch carried by the casing for engaging and holding the latch element of the master member in a set position, the setting member being movable in a setting direction a material distance after the master member is latched in a set position, a spring tending to move the setting member in a non-setting direction, a trigger movably mounted and including a trigger latch element, a lug on the setting element positioned to be held by the trigger latch after setting the master member, said latch for the master member including a cam normally crossing the path of movement of the setting member lug to be released thereby, the continued movement of the setting member taking place with the released master member.

5. In a shutter of the type including an apertured casing, shutter blades pivotally mounted for opening and closing the aperture, and mechanism for operating the shutter blades, the combination with said mechanism, of a master member included therein, a setting and releasing mechanism including a pivotal support for the master member, a setting member movably mounted relative to the pivotal support and slidably engaging the master member, the slidably engaging setting and master members including interengaging surfaces so shaped that the major part of the movement of the setting member moves the master member to a set position, a latch for holding the master member in a set position, the interengaging surfaces also being so shaped that an overtravel of the setting member may take place after the master member is latched in a set position, a trigger, a trigger latch for holding the setting lever after its overtravel is completed, a spring tending to move the setting member against the action of the trigger latch, and means included in the master member latch and setting member for releasing the former by the latter when the latter is released by the trigger.

6. In a shutter of the type including an apertured casing, shutter blades pivotally mounted for opening and closing the aperture, and mechanism for operating the shutter blades, the combination with said mechanism, of a master member included therein, a setting and releasing mechanism including a pivotal support for the master member, a setting member movably mounted relative to the pivotal support and slidably engaging the master member, the slidably engaging setting and master members including interengaging surfaces so shaped that the major part of the movement of the setting member moves the master member to a set position, a latch for holding the master member in a set position, the interengaging surfaces also being so shaped that an overtravel of the setting member may take place after the master member is latched in a set position, a trigger, a trigger latch for holding the setting lever after its overtravel is completed, a spring tending to move the setting member against the action of the trigger latch, and means included in the master member latch and setting member for releasing the former by the latter when the latter is released by the trigger, said means including a cam on the master member latch positioned to be immediately engaged by the setting lever when the setting lever is released by the trigger.

7. In a shutter of the type including an apertured casing, shutter blades pivotally mounted for opening and closing the aperture, and mechanism for operating the shutter blades, the combination with said mechanism, of a master member included therein, a setting and releasing mechanism including a pivotal support for the master member, a setting member movably mounted relative to the pivotal support and slidably engaging the master member, the slidably engaging setting and master members including interengaging surfaces so shaped that the major part of the movement of the setting member moves the master member to a set position, a latch for holding the master member in a set position, the interengaging surfaces also being so shaped that an overtravel of the setting member may take place after the master member is latched in a set position, a trigger, a trigger latch for holding the setting lever after its overtravel is completed, a spring tending to move the setting member against the action of the trigger latch, and means included in the master member latch and setting member for releasing the former by the latter when the latter is released by the trigger, said means including a cam carried by the master member latch, a lug engageable by the trigger and carried by the setting member, said lug directly engaging the cam and releasing the master member latch as the setting member moves in a reverse direction through its overtravel with respect to the master member.

CARL C. FUERST.